Nov. 22, 1938.  E. E. LUNDBERG ET AL  2,137,652
FASTENER DEVICE
Filed Aug. 21, 1936  2 Sheets-Sheet 2
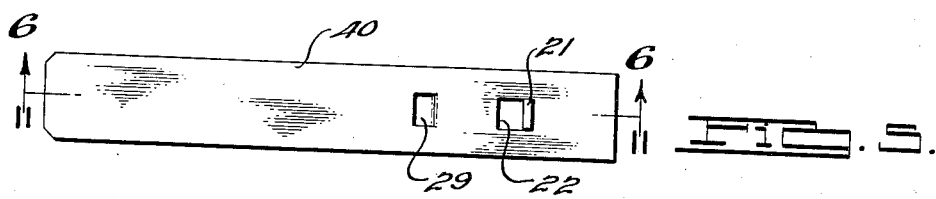
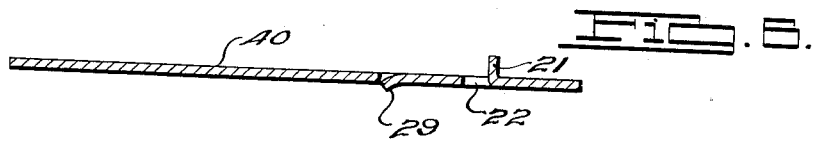
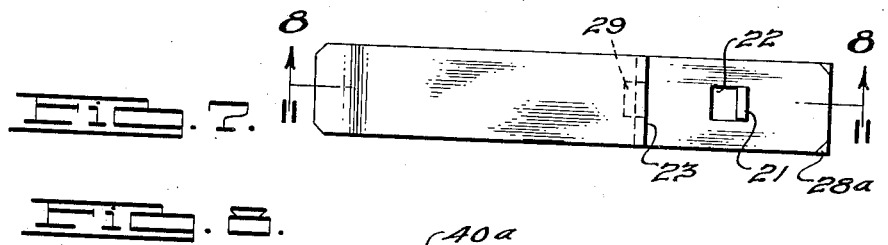
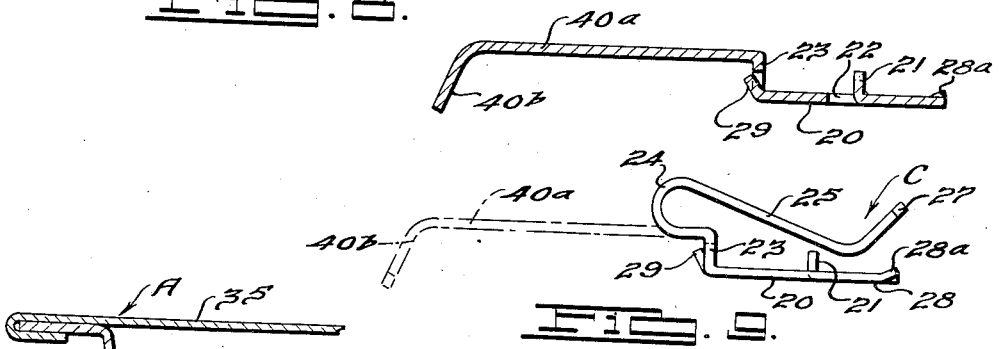
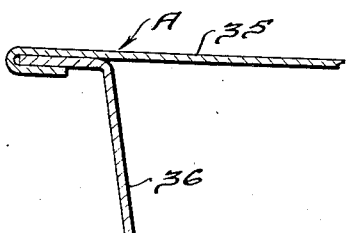
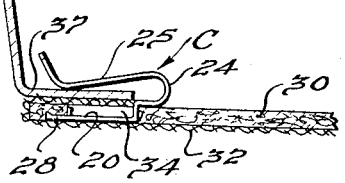
INVENTORS.
Everett E. Lundberg,
Clifford B. Doty,
Edward R. Hathaway.
BY Dike, Calver & Gray
ATTORNEYS.

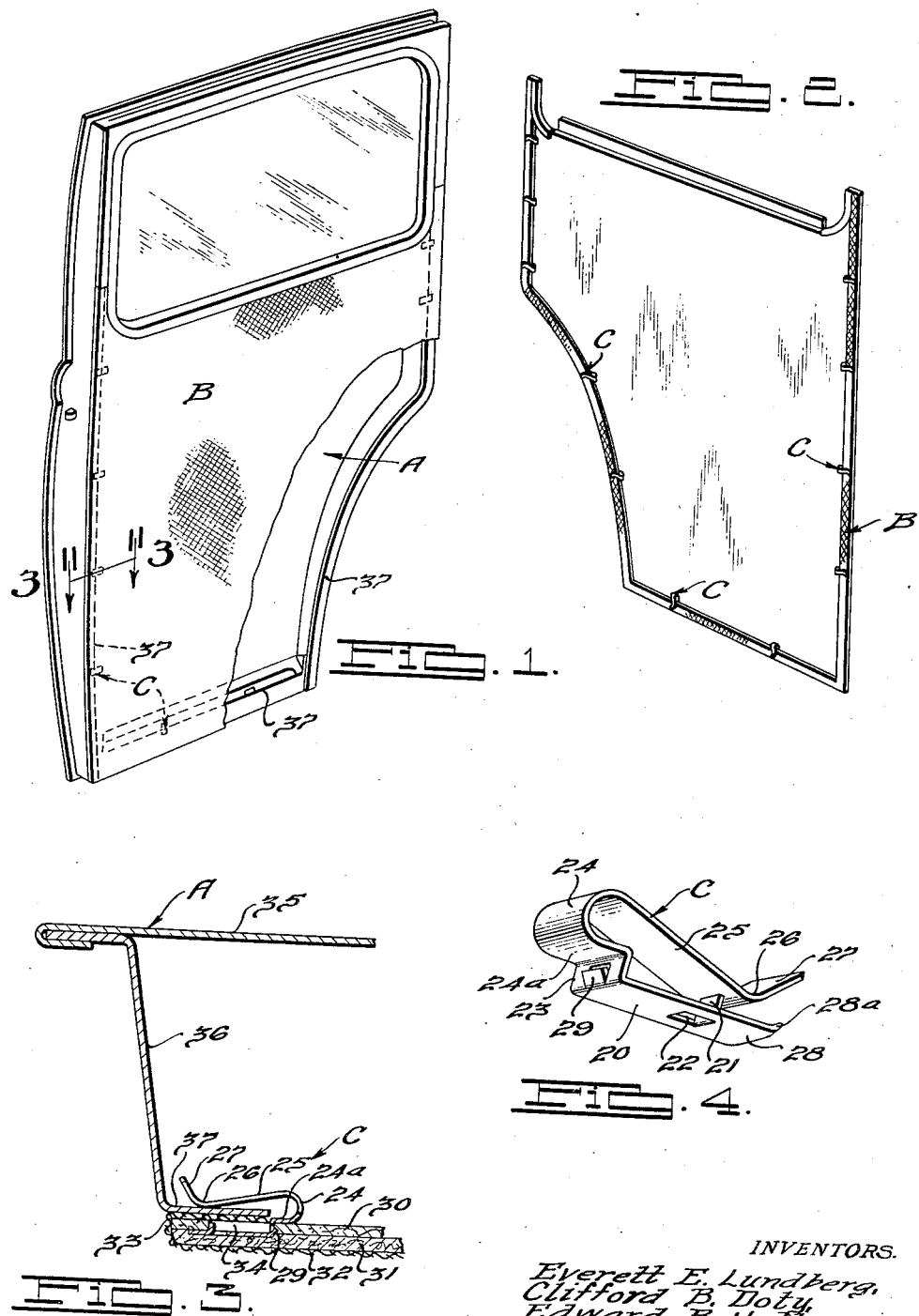

Patented Nov. 22, 1938

2,137,652

UNITED STATES PATENT OFFICE 2,137,652

FASTENER DEVICE

Everett E. Lundberg, Clifford B. Doty, and Edward R. Hathaway, Detroit, Mich., assignors to Briggs Manufacturing Company, Detroit, Mich., a corporation of Michigan Application August 21, 1936, Serial No. 97,234

13 Claims. (Cl. 24—259)

This invention relates to fastener devices for trim panels or the like and particularly to fastener devices adapted for use in the interior trim finish of automobiles or other vehicle bodies.

An object of the invention is to provide an improved fastener means for removably attaching with ease and facility a trim panel or the like to the door or other portion of the framing of a vehicle body.

A further object of the invention is to provide a new and improved fastener device for detachably securing an interior trim panel or the like to the body so that by virtue of the invention there is provided a fastener device of relatively simple construction which may be manufactured at low cost and assembled on the panel with a minimum of time and labor and enabling the provision of a trim panel which may be easily applied to the door or other framing of the vehicle body.

Another object of the invention is to provide an improved fastener device for a trim panel which may be cheaply and easily manufactured from a single piece or strip of metal and which may be assembled on the trim panel after applying the trim material thereto without the necessity of using separate retainer or clip devices for holding the fastener element in place.

Other objects of this invention will appear in the following description and appended claims, reference being had to the accompanying drawings forming a part of this specification wherein like reference characters designate corresponding parts in the several views.

Fig. 1 is a perspective view, partly broken away, illustrating an automobile door having mounted thereon a trim panel embodying the present invention.

Fig. 2 is a perspective view of a trim panel constructed in accordance with the invention, looking at the rear face thereof.

Fig. 3 is an enlarged fragmentary section taken through lines 3—3 of Fig. 1 in the direction of the arrows.

Fig. 4 is a perspective view of a fastener embodying the present invention.

Fig. 5 is a plan view of a metal blank illustrating an initial operation in the formation of the fastener.

Fig. 6 is a section taken through lines 6—6 of Fig. 5 in the direction of the arrows.

Fig. 7 is a plan view of the metal blank illustrating a succeeding operation in the formation of the fastener.

Fig. 8 is a section taken through lines 8—8 of Fig. 7.

Fig. 9 is a side view illustrating the final operation of forming the illustrated fastener.

Fig. 10 is a view similar to Fig. 3 illustrating the application of the fastener to the foundation sheet of a trim panel wherein the padding material is omitted.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings there is illustrated, by way of example, a door A of an automobile body having mounted thereon, through the medium of fasteners C, a trim panel B, the panel and fasteners being constructed in accordance with the present invention. It will be understood that the trim panels may be of different shapes and sizes and may be mounted on the doors or at other localities on the inside of the vehicle body.

Referring particularly to Figs. 3 and 4, the fastener C in the present form thereof comprises as a one-piece device a preferably flat body or shank 20 having intermediate its ends an upstanding lug or abutment 21 struck up at 22 from the metal of the base or shank 20. The rear end of the base 20 is bent substantially at right angles to provide an upstanding shoulder or abutment 23 which forms what may be termed the heel of the fastener. Projecting from the upper edge of this shoulder the metal of the strip is formed with a reverse or goose neck bend providing a spring bow 24, it being noted that this bow comprises a rearwardly extending horizontal portion 24a, adapted, as later described, to overlie the foundation sheet of the trim panel. The metal of the strip from which the fastener is made is extended forwardly and downwardly from the spring bow 24 to provide an extension 25 bent at 26 to produce a curved gripping portion and an upwardly inclined lead end 27. As illustrated, the forward part of the base in advance of the abutment 21 provides in use a tongue or extension 28 and the metal at the forward corners of the portion 28 may be upset to provide projections 28a. In addition, an ear 29 may be lanced out of the metal of the heel 23 in such manner as to extend in an upwardly inclined direction, as illustrated. It will be seen from the foregoing that the fastener comprises a flat horizontal base having upstanding spaced abutments 21 and 23 and a gripping member overlying the base which is formed at one end with a goose neck bend providing a spring bow and formed at the opposite end with a curved gripping portion 26 terminating in an upwardly inclined lead end 27 permitting ready insertion of the flange of the door frame between the gripping member and the rear face of the foundation sheet of the trim panel.

The trim fastener C is applied to and assembled with a trim panel which in the present instance comprises a foundation or backing sheet 30 of fiberboard or other suitable material. The front face of the backing sheet is covered by means of a padding material 31 of compressed jute or other fibrous substance and this layer is in turn covered with a trim fabric 32 which is folded around the edge of the foundation sheet 30 as indicated at 33 and cemented at the rear face of the foundation sheet along the edges thereof. At suitable points along the side and bottom edges of the trim panel and inwardly of the cemented edges of the fabric material the foundation sheet 30 is provided therethrough with holes or slots 34 which in the present instance are substantially rectangular in shape. These holes or apertures are substantially the area and shape of the body or shank 20 of the fastener between the abutments 21 and 23 so that when the fastener is installed that portion thereof extending from the abutment 21 to the abutment 23 will preferably fill and close the hole.

The fastener may be readily assembled on the trim panel by first inserting the tongue or extension 28, which lies forwardly of the abutment 21, into the aperture 34 so as to extend beneath and underlap the forward edge of the aperture, as illustrated in Fig. 3. The rear end of the fastener is then pressed downwardly so as to force the heel 23 into the hole 34 and provide a tight fit of the upstanding abutments 21 and 23 against the edges of the aperture. When the heel 23 is pressed into the aperture the ear 29, due to its inclined shape, is wedged into the rear edge of the aperture 34 within the thickness of the material 30 and by being slightly embedded in this edge it tends to resist withdrawal of the fastener by its frictional or gripping action. Since the front corners 28a of the tongue or flange 28 are slightly bent up they permit this tongue to be inserted between the foundation sheet and the padding 31 without snagging and so as to cause these corners to embed slightly in the underface of the fiberboard 30, as illustrated in Fig. 3.

When the fastener is thus installed it will be seen, as shown in Fig. 3, that the tongue portion 28 underlies the forward edge of the hole or aperture 34 and the extended base 24a of the spring bow overlies and bears against the rear edge of the aperture at the inner face of the foundation material. Furthermore, the abutments 21 and 23 bear tightly against the opposite edges of the aperture, the heel 23 being frictionally gripped against the edge of the aperture by reason of the prong 29. Thus, the shank or body portion 20 fits the bottom of the aperture, entirely fills it and lies nearly flush with the under-face of the sheet 30, as illustrated in Fig. 3.

As illustrated in Fig. 10, the foundation sheet at its under-face may, if desired, be provided with an embossed groove or depression at the forward side of the aperture of sufficient depth so that the tongue or extension 28 will fit therein and permit the base of the fastener to lie exactly flush with the under or front face of the foundation sheet 30 thereby providing a smooth uninterrupted surface. Such a construction is preferable where the padding material 31 is omitted, as shown in Fig. 10, and the trim fabric 32 is applied directly to the front face of the panel board.

In the present instance the trim panel B is assembled on the vehicle door A or other portion of the body. As illustrated in Figs. 1 and 3, the door comprises an outer body panel 35 attached in the usual manner to the upright pillar 36 which at the rear side thereof has an inwardly directed vertically extending flange 37. The framing of the door is such as to provide the flange 37 around the sides and bottom thereof. When assembled on the door structure the trim panel is first provided with fasteners C along the sides and bottom thereof, as shown in Fig. 2. The fabric covered panel may be readily installed by inserting the flared or lead ends 27 behind the flange 37 along one vertical side of the door and then forcing the panel laterally so as to force the gripping portions 26 of the fasteners over the back face of the flange, the gripping portions being pressed or sprung out during this operation so as to grip the flange 37 and clamp the same between the gripping portion 26 and the rear face of the backing sheet 30. The trim panel may then be bowed outwardly a sufficient extent to permit the fasteners C at the opposite vertical edge of the panel to engage behind the edge of the flange 37 at the opposite side of the door. By then flattening out the panel these fasteners will be forced into gripping engagement with the flange. The panel may then be slid downwardly so as to cause the fasteners at the lower edge of the panel to engage behind and grip the bottom flange 37 of the door frame.

There is illustrated in Figs. 5 to 9 inclusive one method of forming a fastener C from a single metal blank or metal strip 40. The blank 40 may be placed in a suitable punch press operating to strike from the metal thereof the lug 21 and the ear or projection 29. In the next operation as illustrated in Figs. 7 and 8, the blank may be formed up by means of suitable dies to provide an offset shank portion 40a with a downwardly extending terminal end 40b. In this operation the heel 23 of the fastener is formed and at the same time the corners 28a of the base are upset. In the following operation, as illustrated in Fig. 9, the shank portion 40a may be bent forwardly around a pilot guide to produce the reverse or goose neck bend 24 with the gripping member 25 inclined downwardly and forwardly in the direction of the forward end of the base. Thus the fastener as illustrated in the present embodiment may be readily produced in three operations from a single metal blank and after being formed up as shown in Fig. 9, the fastener may be suitably tempered.

We claim:
1. A fastener device for a trim panel having an aperture formed therein, comprising a relatively flat base insertable in said aperture having an upstanding lug adapted to abut an end wall of the aperture and an end extension substantially in its plane adapted to overlap the edge of the panel aperture adjacent said end wall, an upstanding abutment spaced from said lug and a portion offset from the base and extending outwardly from said abutment adapted to overlap the opposite edge of the panel aperture, and a spring bow extended from said offset portion and having a gripping extension.

2. A fastener device for a trim panel having an aperture formed therein, comprising a relatively flat base insertable in said aperture having an upstanding lug adapted to abut an end wall of the aperture and an end extension substantially in its plane adapted to overlap the edge of the panel aperture adjacent said end wall at one face of the panel, an upstanding abutment spaced from said lug and a portion offset from the base and extending outwardly from said abutment adapted to overlap the opposite edge of the panel aperture at the opposite face of the panel, and a goose-neck spring bow extended from said offset portion and having a gripping extension adapted to overlie the base.

3. A fastener device for a trim panel having an aperture formed therein, comprising a relatively flat base insertable in said aperture having an upstanding abutment and an end extension beyond the abutment substantially in the plane of the base adapted to underlap one edge of the panel aperture, a flange at the opposite end of the base and offset therefrom to overlap the opposite edge of said aperture, said abutment adapted to extend into the aperture and engage said edge of the aperture and a spring gripping member extended from said flange, said base forming substantially a rigid connection between said flange and abutment, and said flange and gripping member being disposed at the same side of the base.

4. A fastener device according to claim 3 in which said spring gripping member extends from the end of said flange and is reversely bent to overlie said base.

5. A fastener device according to claim 1 in which said gripping extension overlies said base and said upstanding lug and is disposed at the same side of the base as said offset portion.

6. A fastener device for a trim panel having an aperture formed therein, comprising a relatively flat base insertable in said aperture having an upstanding abutment and an end extension beyond the abutment substantially in the plane of the base adapted to underlap one edge of the panel aperture, said abutment adapted to extend into the aperture and engage said edge of the aperture, a flange at the opposite end of the base and offset therefrom to overlap the opposite edge of said aperture, and a spring gripping member extended from the base at the same side thereof as said flange and overlying said base, said base forming substantially a rigid connection between said flange and abutment, and said flange and extension extending in different planes substantially parallel to the base.

7. A fastener device for a trim panel, comprising a substantially flat base, a pair of longitudinally spaced upstanding shoulders extending from the base, said base having an end extension substantially in its plane, a flange extending from one shoulder and offset from said base, and a spring gripping member extending from said flange and disposed at the same side of the base as said flange and overlying the base.

8. A fastener device according to claim 7 in which said end extension and flange extend in opposite directions in different planes.

9. A fastener device according to claim 1 in which said abutment is provided with a gripping projection.

10. A fastener device according to claim 7 in which one of said shoulders is provided with a surface projection.

11. A fastener device for a trim panel, comprising a substantially flat base, a pair of longitudinally spaced upstanding shoulders extending from the base, one of said shoulders being provided with a gripping projection struck from the metal thereof, said base having an end extension substantially in its plane, a flange extending from one shoulder and offset from said base, and a spring gripping member extending from one of the shoulders, said base forming substantially an inflexible connection between said shoulders, and said gripping member being disposed at the same side of the base as said flange.

12. A fastener device according to claim 1 in which said lug is struck from the metal of the base between the side edges thereof, in which said gripping extension overlies the base, and an upwardly and outwardly inclined lug is struck from the metal of said abutment.

13. A fastener device for a trim panel having an aperture formed therein, comprising a relatively flat base insertable in said aperture having an upstanding abutment engaging an edge of the aperture and formed with an ear struck out and inclined upwardly from the abutment and constituting a gripping projection engaging an edge of the aperture, a flange extending from said abutment and offset from the base to overlap an edge of the aperture, and a spring connected to said flange and extending generally in the direction of the plane of the panel.

EVERETT E. LUNDBERG.
CLIFFORD B. DOTY.
EDWARD R. HATHAWAY.